United States Patent
Wong

(10) Patent No.: US 7,617,213 B2
(45) Date of Patent: Nov. 10, 2009

(54) METHOD AND APPARATUS FOR FACILITATING OPTIMISTIC AUTHORIZATION IN A DATABASE

(75) Inventor: Daniel ManHung Wong, Sacramento, CA (US)

(73) Assignee: Oracle International Corporation, Redwood Shores, CA (US)

( * ) Notice: Subject to any disclaimer, the term of this patent is extended or adjusted under 35 U.S.C. 154(b) by 967 days.

(21) Appl. No.: 11/195,168

(22) Filed: Aug. 1, 2005

(65) Prior Publication Data

US 2007/0028295 A1    Feb. 1, 2007

(51) Int. Cl.
G06F 17/30    (2006.01)
(52) U.S. Cl. .................. 707/9; 707/104.1; 726/27
(58) Field of Classification Search .............. 707/9, 707/104.1; 726/27, 28
See application file for complete search history.

(56) References Cited

U.S. PATENT DOCUMENTS

| | | | |
|---|---|---|---|
| 7,120,635 B2* | 10/2006 | Bhide et al. | 707/9 |
| 7,216,125 B2* | 5/2007 | Goodwin | 707/9 |
| 7,437,554 B1* | 10/2008 | Arnold et al. | 713/160 |
| 2003/0088434 A1* | 5/2003 | Blechman | 705/1 |
| 2004/0078340 A1* | 4/2004 | Evans | 705/64 |
| 2004/0260699 A1* | 12/2004 | Aoki et al. | 707/9 |

* cited by examiner

*Primary Examiner*—Leslie Wong
(74) *Attorney, Agent, or Firm*—Park, Vaughan & Fleming LLP

(57) ABSTRACT

A method, computer-readable storage medium, and an apparatus are provided to facilitate authorizing a user during a database transaction. The method starts by receiving a request at the database to perform a database operation. Upon receiving the request, the database sends an authorization request to an authorization module to determine if the user has authorization to perform the database operation. In addition, the database continues executing the database operation without waiting for completion of the authorization request. Next, the database receives a response from the authorization module. The database then checks the response to determine if the user has authorization to perform the database operation. If so, the database commits the database operation, and if not, the database rolls back the database operation.

18 Claims, 2 Drawing Sheets

METHOD AND APPARATUS FOR FACILITATING OPTIMISTIC AUTHORIZATION IN A DATABASE

BACKGROUND

1. Field of the Invention

The present invention relates to database systems. More specifically, the present invention relates to a method and an apparatus for facilitating optimistic authorization in a database system.

2. Related Art

Transactions within a database often require authorization before they are allowed to proceed. Unless a user is in the rare situation of being the administrator and sole user of the database, several levels of security generally exist. These levels typically differ in the privileges they confer to the user. These privileges, in turn, restrict what types of transactions the user can and cannot execute.

In systems that require such authorizations for transactions to execute, the user's authorization level must first be determined in order to verify whether the database can honor the user's request to execute the transaction. Unfortunately, these security checks can incur a significant amount of overhead, and can thus greatly reduce the performance of a database system. Moreover, the added overhead can be especially high when security checks involve contacting remote services. Furthermore, auxiliary operations associated with the security checks, such as logging or auditing, can introduce yet even more overhead. Because of the overhead required to perform security checks, customers are often faced with a decision about whether to sacrifice either security or performance.

Past efforts to increase performance have typically focused on making security-related operations execute as fast as possible. Due to the inherent nature of security checks, overhead cannot easily be reduced without trivializing the security checks.

Hence, what is needed is a method and an apparatus that facilitates reducing the overhead involved in performing security checks while maintaining a high level of security.

SUMMARY

One embodiment of the present invention provides a system that facilitates authorizing a user during a database transaction. The system starts by receiving a request at the database to perform a database operation. Upon receiving the request, the database sends an authorization request to an authorization module to determine if the user has authorization to perform the database operation. In addition, the database continues executing the database operation without waiting for completion of the authorization request. Next, the database receives a response from the authorization module. The database then checks the response to determine if the user has authorization to perform the database operation. If so, the database commits the database operation, and if not, the database rolls back the database operation.

In a variation of this embodiment, the user can be either a person or an application.

In a variation of this embodiment, the database operation is a transaction comprised of a plurality of database commands, wherein the entire transaction requires a single authorization.

In a further variation, the response from the authorization module includes a transaction identifier and a list of identifiers for database commands that are not authorized to commit.

In a further variation, the database cancels any database command that is not authorized and commits the rest of the database commands.

In a variation of this embodiment, the authorization module can be: an additional computer system, an additional processor core, a server, the database itself, or any other authorization-determining device.

In a variation of this embodiment, if the database has not received a response from the authorization module, the database waits until a response is received.

In a variation of this embodiment, after performing a rollback operation, the database may audit and/or log subsequent database operations.

DETAILED DESCRIPTION

The following description is presented to enable any person skilled in the art to make and use the invention, and is provided in the context of a particular application and its requirements. Various modifications to the disclosed embodiments will be readily apparent to those skilled in the art, and the general principles defined herein may be applied to other embodiments and applications without departing from the spirit and scope of the present invention. Thus, the present invention is not intended to be limited to the embodiments shown, but is to be accorded the widest scope consistent with the principles and features disclosed herein.

The data structures and code described in this detailed description are typically stored on a computer readable storage medium, which may be any device or medium that can store code and/or data for use by a computer system. This includes, but is not limited to, magnetic and optical storage devices such as disk drives, magnetic tape, CDs (compact discs) and DVDs (digital versatile discs or digital video discs), and computer instruction signals embodied in a transmission medium (with or without a carrier wave upon which the signals are modulated). For example, the transmission medium may include a communications network, such as the Internet.

Computing Systems

Figure 1:
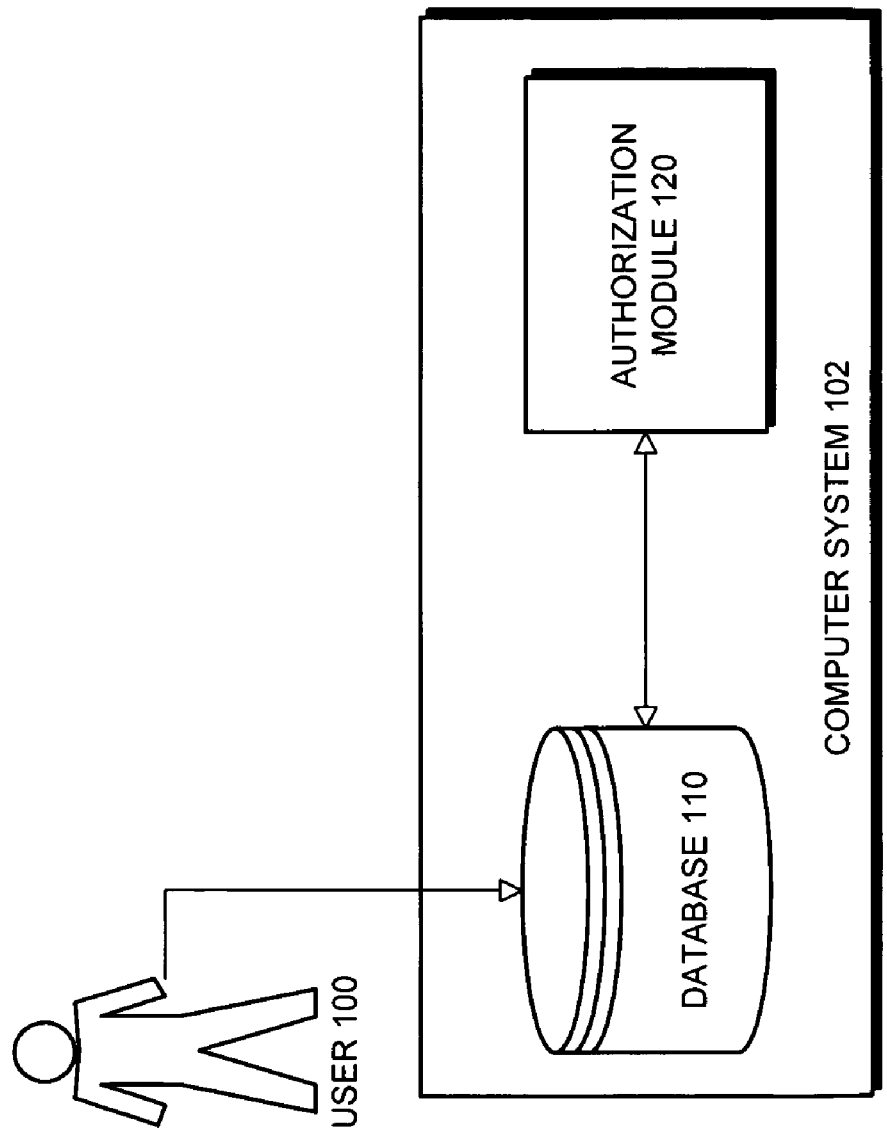
FIG. 1 illustrates a computer system in accordance with an embodiment of the present invention.

FIG. 1 illustrates a computer system 102 in accordance with an embodiment of the present invention. Computer system 102 includes user 100, database 110 and authorization module 120. During operation, computer system 102 receives commands from user 100. User 100 can generally include an individual, and any type of computer application that may directly or indirectly communicate with a database.

Database 110 can include any type of system for storing data in non-volatile storage. This includes, but is not limited to, systems based upon magnetic, optical, and magneto-optical storage devices, as well as storage devices based on flash memory and/or battery-backed up memory.

Authorization module 120 can be any type of module that performs authorization, or authentication of a user or transaction. Note that authorization module 120 may or may not be contained within the primary database system. Furthermore, authorization module 120 may not run on the same processing system as database 110. Authorization module 120 can include, but is not limited to, a system running on a secondary processor core, another computer system, or a server. Authorization module 120 may alternatively be incorporated into database 110. Note that it will be obvious to a practitioner with ordinary skill in the art that this system is not limited to the users, databases, and authorization modules shown, but can include any number, and different varieties of these devices.

Executing an Operation

Figure 2:
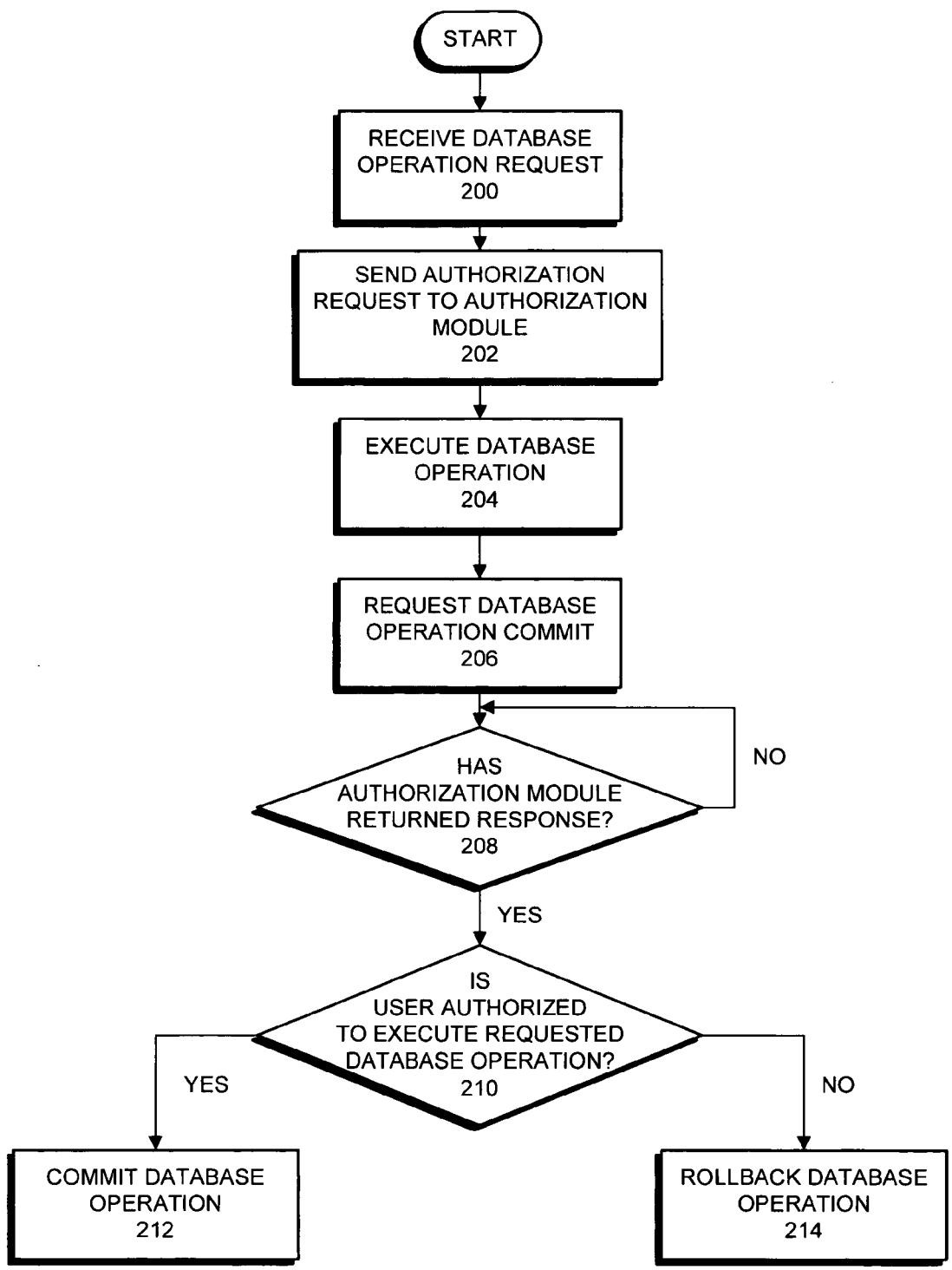
FIG. 2 presents a flowchart illustrating the process of optimistic authorization in accordance with an embodiment of the present invention.

FIG. 2 presents a flowchart illustrating the process of optimistic authorization in accordance with an embodiment of the present invention. The system starts when database 110 receives a database operation request sent by user 100 (step 200).

Note that in one embodiment of the present invention, the database operation is a transaction that includes a single database command. However, in another embodiment, the database operation includes more than one database command.

The system first sends an authorization request to authorization module 120 to determine whether user 100 is authorized to execute a corresponding database operation (step 202). The system continues to execute the database operation regardless of whether it has received a response from authorization module 120 (step 204).

When the database operation nears completion, the system attempts to commit the database operation (step 206). Before the commit can take place, the system first checks if authorization module 120 has sent a response to the authorization request (step 208). If no response has been received, the system waits until the system has received a response from authorization module 120.

In one embodiment of the present invention, the response from authorization module 120 associates the authorization with a single database operation identified by a transaction identifier. In this embodiment, the authorization encompasses the single database operation.

However, in another embodiment of the present invention, the response from authorization module 120 is associated with a number of individual database commands. In this embodiment, the response includes a transaction identifier, which identifies the database operation whose authorization is being checked. In addition, the response includes a list of database command identifiers representing the database commands that are not authorized to be executed by user 100.

Once the system has received an authorization response, the system checks if user 100 was authorized to execute the database operation (step 210). If so, the system proceeds with its commit of the database operation (step 212). If not, database 110 rolls back the transaction, thus restoring database 110 to a point before the database operation was executed.

In one embodiment of the present invention, all authorized database commands will commit and all database commands that were not authorized for user 100 will rollback.

In one embodiment of the present invention, the rollback may also involve auditing the system, turning on logging, or modifying log settings, and any other operations which generally occur after a rollback.

In one embodiment of the present invention, the system operates with multiple database operations. In some such systems, this allows for a significant increase in throughput because bottlenecks are greatly diminished allowing not only multiple database operations, but multiple users to request executions of database operations.

In one embodiment of the present invention, the system operates with multiple database transactions. This provides for, but is not limited to, systems which are configured for distributed transactions. Additionally, bottlenecks are greatly diminished in a manner similar to that of the embodiment involving multiple database operations.

In one embodiment of the present invention, the system can be configured to operate with any combination of database transactions, database operations, and database commands. Systems with these capabilities have the capability to be much faster due to the increased throughput that is possible and the decreased bottleneck.

The foregoing descriptions of embodiments of the present invention have been presented for purposes of illustration and description only. They are not intended to be exhaustive or to limit the present invention to the forms disclosed. Accordingly, many modifications and variations will be apparent to practitioners skilled in the art. Additionally, the above disclosure is not intended to limit the present invention. The scope of the present invention is defined by the appended claims.

What is claimed is:

1. A method to authorize a user during a database transaction comprising:
    receiving a request at the database to perform a database operation;
    sending an authorization request to an authorization module to determine if the user has authorization to perform the database operation;
    executing the database operation without waiting for the completion of the authorization request;
    if a response from the authorization module is not available, waiting until the response is available;
    if the response is avaiblable, receiving the response from the authorization module;
    checking the response to determine if the user has authorization to perform the database operation;
    if so, committing the database operation to a storage device; and
    if not, rolling back the database operation to a point before the database operation was executed.

2. The method of claim 1, wherein the user can be:
    a person; or
    an application.

3. The method of claim 1, wherein the database operation is a transaction comprised of a plurality of database commands, and wherein the entire transaction requires a single authorization.

4. The method of claim 3, wherein each database command in the plurality of database commands is associated with a database command identifier, and wherein the response from the authorization module includes a transaction identifier and a list of identifiers for database commands that are not authorized to commit.

5. The method of claim 4, further comprising canceling database commands that are not authorized and committing authorized database commands.

6. The method of claim 1, wherein the authorization module can include:
    an additional computer system;
    an additional processor core;
    a server;
    the database; and
    any other authorization-determining device.

7. The method of claim 1, wherein upon performing a rollback, the method further comprises:
    auditing subsequent database operations; and
    logging subsequent database operations.

8. A computer-readable storage medium storing instructions that when executed by a computer cause the computer to perform a method to authorize a user during a database transaction, wherein the method comprises:
receiving a request at the database to perform a database operation;
sending an authorization request to an authorization module to determine if the user has authorization to perform the database operation;
executing the database operation without waiting for the completion of the authorization request;
if a response from the authorization module is not available, waiting until the response is available;
if the response is available, receiving the response from the authorization module;
checking the response to determine if the user has authorization to perform the database operation;
if so, committing the database operation to a storage device; and
if not, rolling back the database operation to a point before the database operation was executed.

9. The computer-readable storage medium of claim 8, wherein the user can be:
a person; or
an application.

10. The computer-readable storage medium of claim 8, wherein the database operation is a transaction comprised of a plurality of database commands, and wherein the entire transaction requires a single authorization.

11. The computer-readable storage medium of claim 10, wherein each database command in the plurality of database commands is associated with a database command identifier, and wherein the response from the authorization module includes a transaction identifier and a list of identifiers for database commands that are not authorized to commit.

12. The computer-readable storage medium of claim 11, further comprising canceling database commands that are not authorized and committing the authorized database commands.

13. The computer-readable storage medium of claim 8, wherein the authorization module can include:
an additional computer system;
an additional processor core;
a server;
the database; and
any other authorization-determining device.

14. The computer-readable storage medium of claim 8, wherein upon performing a rollback, the method further comprises:
auditing subsequent database operations; and
logging subsequent database operations.

15. An apparatus to authorize a user at a database comprising:
a database;
a receiving mechanism configured to receive database operation requests from the user;
an authorization module configured to determine if the user has authorization to perform the database operation;
a sending mechanism configured to send authorization check requests to the authorization module;
an execution mechanism configured to execute the database operation without waiting for the completion of the authorization request;
wherein if a response from the authorization module is not available, the receiving mechanism is configured to wait until the response is available; and
wherein if the response is available, the receiving mechanism is configured to receive the response from the authorization module;
a determination mechanism configured to determine if the user had authorization to perform the database operation by checking the response;
a commit mechanism configured to commit the database operation to a storage device if the user has authorization; and
a rollback mechanism configured to perform a rollback of the database operation to a point before the database operation was executed if the user does not have authorization.

16. The apparatus of claim 15, wherein the user can be:
a person; or
an application.

17. The apparatus of claim 15, wherein the authorization module can include:
an additional computer system;
an additional processor core;
a server;
the database; and
any other authorization-determining device.

18. The apparatus of claim 15, wherein the rollback mechanism further comprises:
an auditing mechanism configured to audit database operations; and
a logging mechanism configured to log database operations.

* * * * *

UNITED STATES PATENT AND TRADEMARK OFFICE
CERTIFICATE OF CORRECTION

PATENT NO. : 7,617,213 B2 Page 1 of 1
APPLICATION NO. : 11/195168
DATED : November 10, 2009
INVENTOR(S) : Daniel ManHung Wong It is certified that error appears in the above-identified patent and that said Letters Patent is hereby corrected as shown below:

Title page, item (*) Notice: Subject to any disclaimer, the term of this patent is extended or adjusted under 35 U.S.C. 154(b) by 967 days.

Delete the phrase "by 967 days" and insert -- by 1115 days --.

In column 4, line 30, in claim 1, delete "avaiblable," and insert -- available, --, therefor.

Signed and Sealed this

Twenty-fourth Day of August, 2010

David J. Kappos
*Director of the United States Patent and Trademark Office*